United States Patent
Shimizu et al.

(10) Patent No.: US 12,104,925 B2
(45) Date of Patent: Oct. 1, 2024

(54) SENSOR DEVICE

(71) Applicant: Sumitomo Wiring Systems, Ltd., Yokkaichi (JP)

(72) Inventors: Moriyuki Shimizu, Yokkaichi (JP); Kyungwoo Kim, Yokkaichi (JP); Toshinari Kobayashi, Yokkaichi (JP); Hironobu Yamamoto, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 163 days.

(21) Appl. No.: 17/756,409

(22) PCT Filed: Nov. 12, 2020

(86) PCT No.: PCT/JP2020/042241
§ 371 (c)(1),
(2) Date: May 24, 2022

(87) PCT Pub. No.: WO2021/106598
PCT Pub. Date: Jun. 3, 2021

(65) Prior Publication Data
US 2023/0003559 A1   Jan. 5, 2023

(30) Foreign Application Priority Data
Nov. 27, 2019   (JP) .................... 2019-214318

(51) Int. Cl.
*G01D 11/24*   (2006.01)

(52) U.S. Cl.
CPC .................... *G01D 11/245* (2013.01)

(58) Field of Classification Search
CPC .................................... G01D 11/245
See application file for complete search history.

(56) References Cited

U.S. PATENT DOCUMENTS

| | | | |
|---|---|---|---|
| 2004/0113801 A1 | 6/2004 | Gustafson et al. | |
| 2014/0182883 A1* | 7/2014 | Sugita | C09D 123/0853 525/286 |
| 2017/0153265 A1 | 6/2017 | Yamamoto et al. | |

FOREIGN PATENT DOCUMENTS

| | | | |
|---|---|---|---|
| EP | 505581 A1 | 9/1992 | |
| EP | 2749612 A1 * | 7/2014 | .......... C08L 23/0815 |
| JP | H2-046121 | 2/1990 | |
| JP | H1-140037 A | 2/1999 | |
| JP | 2012-230157 A | 11/2012 | |

OTHER PUBLICATIONS

International Search Report, Application No. PCT/JP2020/042241, mailed Jan. 26, 2021. ISA/Japan Patent Office.

* cited by examiner

*Primary Examiner* — Jamel E Williams
(74) *Attorney, Agent, or Firm* — Honigman LLP

(57) ABSTRACT

An object of the present disclosure is to improve the resistance of a sensor device to external damage. A sensor device includes a sensor element, and a resin cover part that covers the sensor element, wherein at least a portion of a surface of the resin cover part is cross-linked.

6 Claims, 3 Drawing Sheets

SENSOR DEVICE

CROSS-REFERENCE TO RELATED APPLICATIONS

This application is the U.S. national stage of PCT/JP2020/042241 filed on Nov. 12, 2020, which claims priority of Japanese Patent Application No. JP 2019-214318 filed on Nov. 27, 2019, the contents of which are incorporated herein.

TECHNICAL FIELD

The present disclosure relates to a sensor device.

BACKGROUND

JP 2017-96828A discloses that, for example, injection molding or the like is performed to obtain a molding in which a detection unit including a detection element part, and a holder part are formed as one piece, and injection molding or the like is further performed on the molding to obtain a resin molded p art.

JP 2012-230157A discloses that a surface layer of an intermediate transfer belt member is electron beam cross-linked in order to prevent fusion of a toner.

Sensor devices may be exposed to a severe environment. Thus, there is a demand for further improving the resistance of a sensor device to external damage.

Therefore, it is an object of the present disclosure to improve the resistance of a sensor device to external damage.

SUMMARY

According to the present disclosure, a sensor device includes a sensor element, and a resin cover part that covers the sensor element, wherein at least a portion of a surface of the resin cover part is cross-linked.

Advantageous Effects

According to the present disclosure, the resistance of a sensor device to external damage is improved.

DETAILED DESCRIPTION OF PREFERRED EMBODIMENTS

Figure 1:
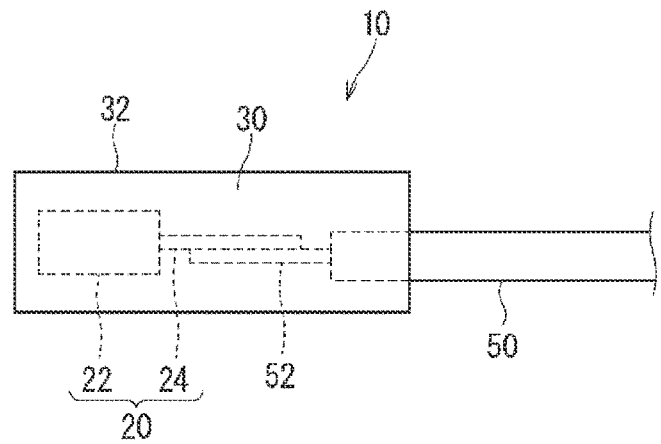
FIG. 1 is a side view showing a sensor device according to Embodiment 1.

First, embodiments of the present disclosure will be listed and described.

The sensor device according to the present disclosure is as follows.

First Aspect

A sensor device includes a sensor element, and a resin cover part that covers the sensor element, wherein at least a portion of a surface of the resin cover part is cross-linked. At least a portion of the surface of the resin cover part is cross-linked. This cross-linked portion is hard. Therefore, the resistance of the sensor device to external damage is improved.

Second Aspect

In a second aspect, as with the above-described first aspect, the at least a portion of the surface of the resin cover part may be electron beam cross-linked. Even if a resin for cross-linking is not added to a resin for forming the resin cover part, the at least a portion of the surface of the resin cover part is electron beam cross-linked.

Third Aspect

In a third aspect, as with the above-described first or second aspect, the at least a portion of the surface of the resin cover part may have the highest crosslink density. Since the surface of the resin cover part has a high crosslink density, the resistance to external damage is improved.

Fourth Aspect

In a fourth aspect, as with any one of the first to third aspects described above, the resin cover part may include a primary molded part that holds the sensor element, and a secondary molded part that covers the primary molded part, and at least a portion of the surface of the secondary molded part may be cross-linked. Since at least a portion of the surface of the secondary molded part is cross-linked, the resistance of the sensor device to external damage is improved.

Fifth Aspect

In a fifth aspect, as with the above-described fourth aspect, the primary molded part may include a rib portion that protrudes toward the secondary molded part, and a portion that extends from the at least a portion of the surface of the secondary molded part to a leading end of the rib portion may be cross-linked. The leading end of the rib portion is fused to the secondary molded part. The fused portion is hardened by the cross-linking. Accordingly, the water stopping performance is readily maintained by the rib portion.

Sixth Aspect

In a sixth aspect, as with the fifth aspect, the secondary molded part may have a hole extending from the surface of the secondary molded part, and the rib portion may include an annular rib portion that surrounds the hole. The hole can be used as a hole for a positioning pin for positioning the primary molded part when molding the secondary molded part using a metal mold. Since the portion that extends from the at least a portion of the surface of the secondary molded part to the leading end of the rib portion is cross-linked, ingress of water via the hole is effectively prevented.

The following will describe specific examples of the sensor device according to the present disclosure with reference to the drawings. Note that the present disclosure is not limited to the examples but is defined by the claims, and all modifications within the meaning and scope equivalent to the claims are intended to be included.

Embodiment 1

Hereinafter, a sensor device according to Embodiment 1 will be described. FIG. 1 is a side view showing a sensor device 10 according to Embodiment 1.

The sensor device 10 includes a sensor element 20 and a resin cover part 30.

The sensor element 20 is an element that detects a physical quantity of magnetism, light, temperature, or the like, or an amount of change thereof. Here, the sensor element 20 includes an element body part 22 and a lead part 24. The element body part 22 is rectangular, for example. The lead part 24 is an elongated part made of metal or the like. The lead part 24 extends outward from the element body part 22. An output signal is output from the sensor element 20 to the outside via the lead part 24.

A core wire 52 of a wire 50 is connected to the lead part 24. The connection between the core wire 52 and the lead part 24 may be realized by soldering or pressure bonding, for example.

The resin cover part 30 covers the sensor element 20. The resin cover part 30 may cover the entire periphery of the element body part 22 of the sensor element 20. A portion of the element body part 22 may be exposed from the resin cover part 30. FIG. 1 shows an example in which the entirety of the element body part 22 is covered by the resin cover part 30. The portion of the element body part 22 that is covered by the resin cover part 30 is protected by the resin cover part 30.

At least a portion of a surface 32 of the resin cover part 30 is cross-linked. Here, "cross-linked" refers to a state in which polymers, which are constituent components, are bonded to each other. Here, the entirety of the surface 32 of the resin cover part 30 is cross-linked. This resin cover part 30 may be made of, for example, PE (polyethylene), polyamide, PBT (polybutylene terephthalate), or the like.

The cross-linked portion of the surface 32 of the resin cover part 30 is preferably obtained by electron beam cross-linking. Electron beam cross-linking refers to a method of irradiating polymers with an electron beam so that the polymers are bonded to each other, and have a three-dimensional structure. When a resin is electron beam cross-linked, polymers are three-dimensionally bonded to each other, and heat resistance is improved. Specifically, an electron beam cross-linked resin has an advantage that it is unlikely to soften and remains hard even under a high temperature.

Electron beam cross-linking is realized by, for example, irradiating the surface 32 of the resin cover part 30 with an electron beam in a state in which the sensor element 20 is covered by the resin cover part 30. At this time, a configuration is possible in which a region of the resin cover part 30 that does not reach the element body part 22 of the sensor element 20 is cross-linked. With this, it is possible to prevent the sensor element 20 from being damaged by electron beams.

When the surface 32 of the resin cover part 30 is irradiated with an electron beam, the surface 32 of the resin cover part 30 is irradiated with the largest amount of energy. Therefore, at least a portion of the surface 32 of the resin cover part 30 has the highest crosslink density. The crosslink density decreases inward from the surface 32 of the resin cover part 30. Note that a crosslink density refers to the proportion of cross-linking points present in cross-linked polymers to the structural unit as a whole. Electron beams may affect the sensor element 20 provided inside to some extent. Therefore, a portion of the resin cover part 30 that reaches the sensor element 20 is preferably not electron beam cross-linked.

It is not essential that the resin cover part 30 is electron beam cross-linked, and a configuration is also possible in which the resin cover part 30 is chemically cross-linked. Electron beam cross-linking has an advantage that a cross-linking agent or the like does not need to be added to the material for forming the resin cover part 30.

According to the present embodiment, at least a portion of the surface 32 of the resin cover part 30 is cross-linked. This cross-linked portion is hard. Therefore, the resistance of the sensor device 10 to external damage is improved.

Also, the cross-linked portion is likely to remain hard even when the temperature increases. Therefore, the resistance to external damage in a high temperature environment can be maintained.

Embodiment 2

Figure 2:
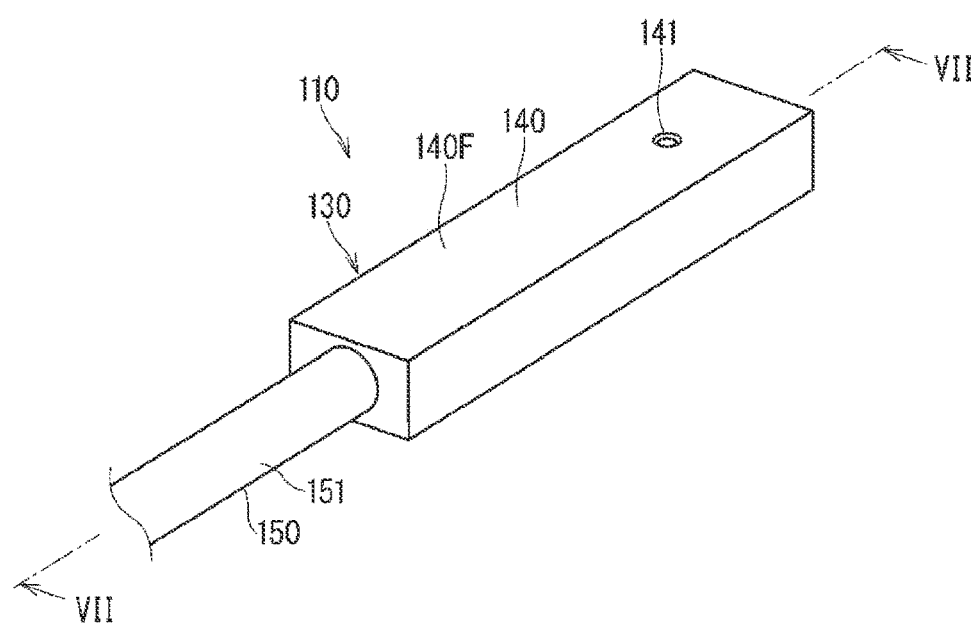
FIG. 2 is a perspective view showing a sensor device according to Embodiment 2.
Figure 3:
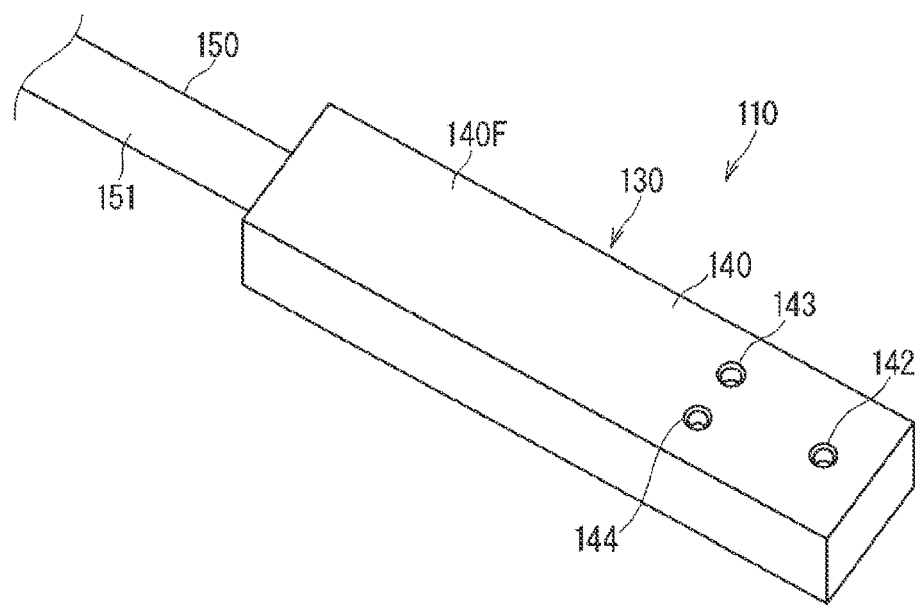
FIG. 3 is a perspective view showing the sensor device according to Embodiment 2.
Figure 4:
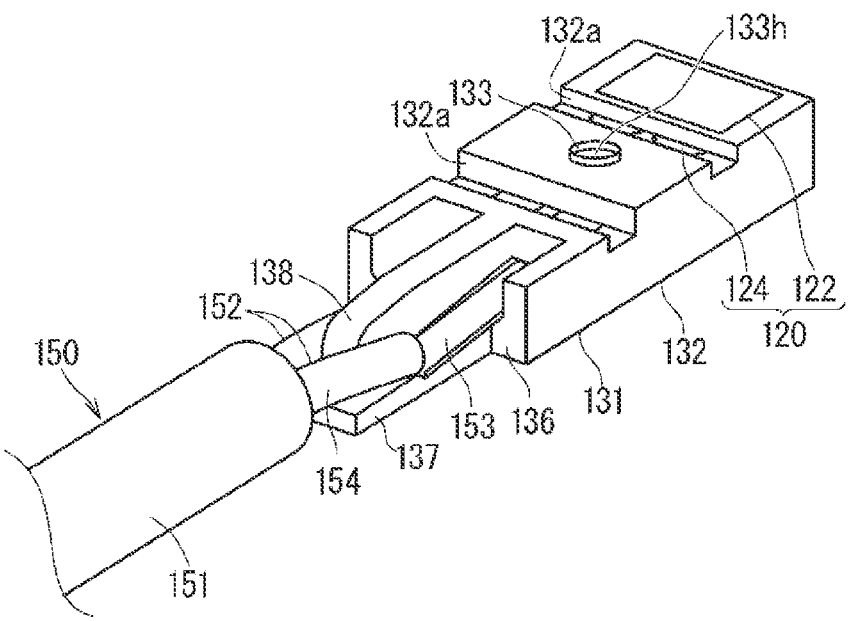
FIG. 4 is a perspective view showing a sensor element and a primary molded part of the sensor device.
Figure 5:
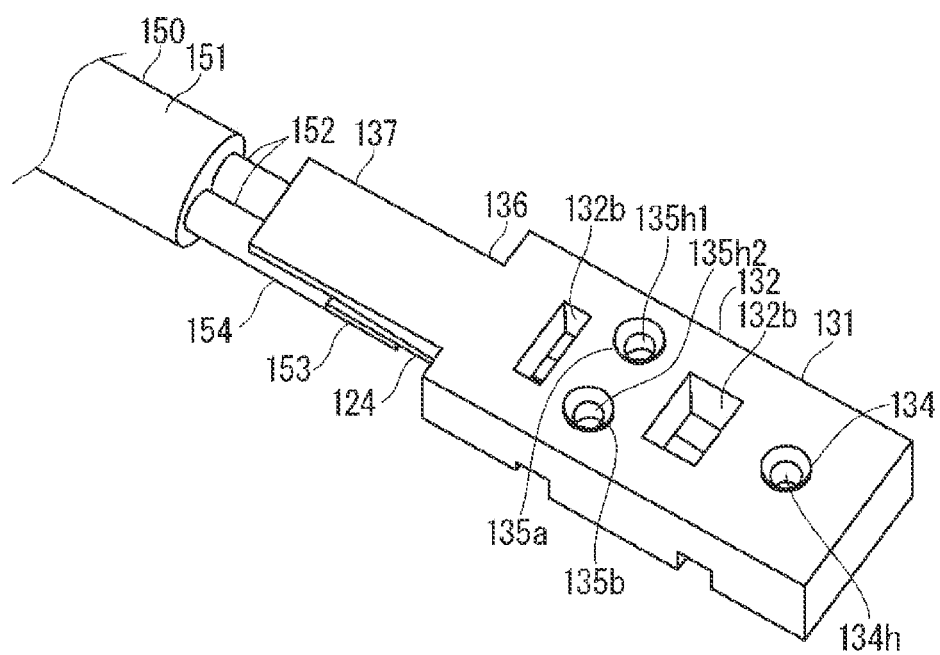
FIG. 5 is a perspective view showing the sensor element and the primary molded part of the sensor device.
Figure 6:
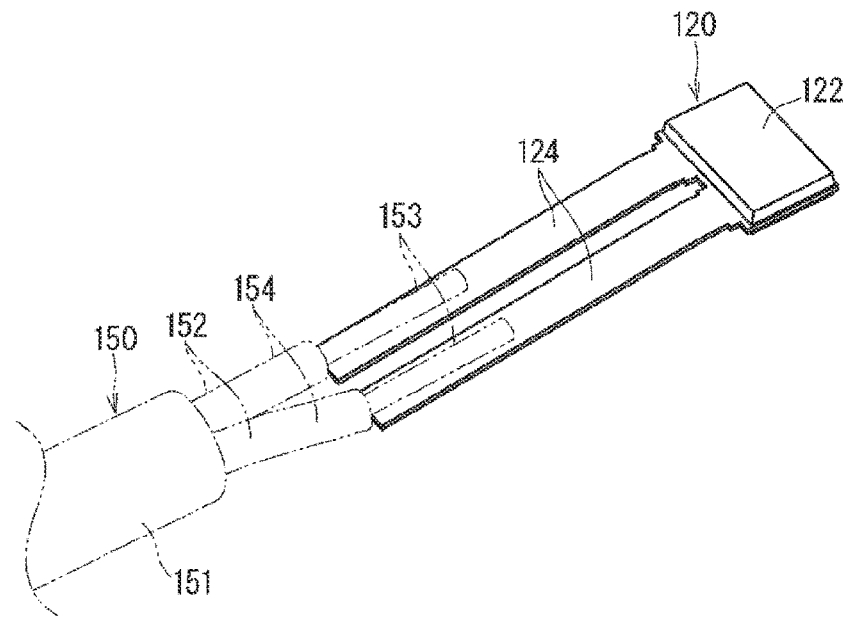
FIG. 6 is a perspective view showing the sensor element.
Figure 7:
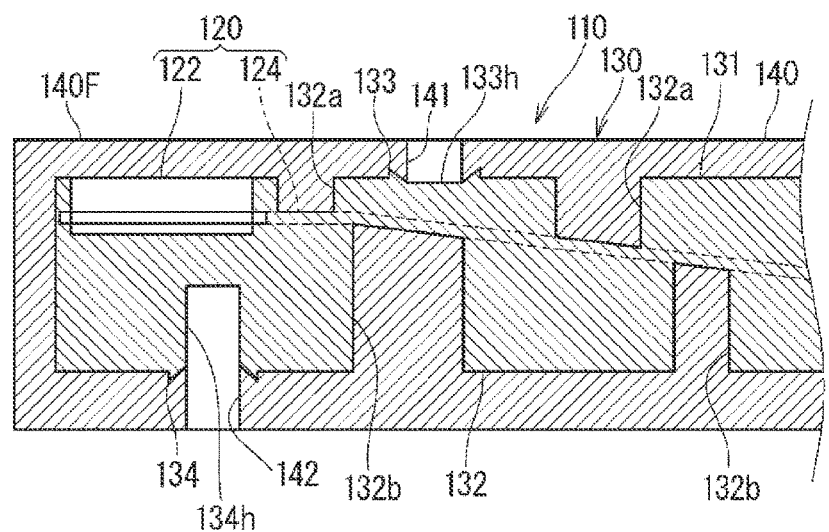
FIG. 7 is a cross-sectional view taken along a line VII-VII in FIG. 2.
Figure 8:
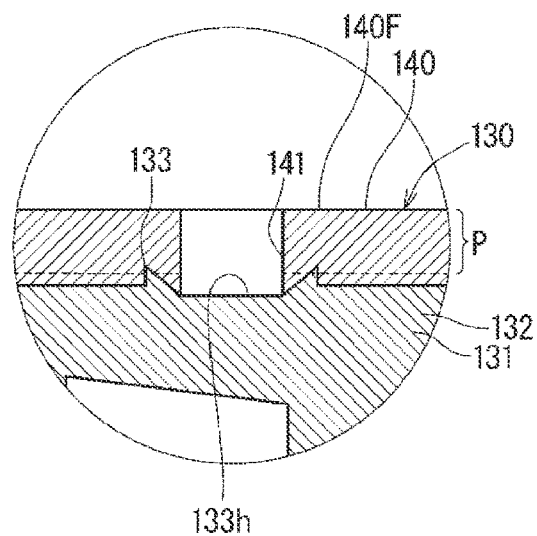
FIG. 8 is a partially enlarged cross-sectional view of FIG. 7.

The following will describe a sensor device 110 according to Embodiment 2. FIGS. 2 and 3 are perspective views showing the sensor device 110 according to Embodiment 2. FIGS. 4 and 5 are perspective views showing a sensor element 120 and a primary molded part 131 of the sensor device 110. FIG. 6 is a perspective view showing the sensor element 120. FIG. 7 is a cross-sectional view taken along a line VII-VII in FIG. 2. FIG. 8 is a partially enlarged cross-sectional view of FIG. 7.

The sensor device 110 includes the sensor element 120 (see FIGS. 4, 6, and 7) and a resin cover part 130. At least a portion of a surface 140F of the resin cover part 130 is cross-linked, as in the above-described Embodiment 1. Here, the entirety of the surface 140F of the resin cover part 130 is cross-linked.

More specifically, similar to the above-described sensor element 20, the sensor element 120 is an element that detects a physical quantity of magnetism, light, temperature, or the like, or an amount of change thereof. Hereinafter, a description will be given assuming that the sensor element 120 is a magnetic sensor. A magnetic field is unlikely to be affected by a resin, which is a nonmagnetic material. Therefore, when the sensor element 120 is a magnetic sensor, the entire periphery of the sensor element 120 may also be covered by the resin cover part 130.

The sensor element 120 includes an element body part 122 and a lead part 124. The element body part 122 has the shape of a flat rectangular plate, for example. The element body part 122 outputs a signal that corresponds to the magnitude, direction, or the like of a surrounding environment such as a surrounding magnetic field. The lead part 124 extends from the element body part 122. Here, two lead parts 124 extend parallel to each other from the element body part 122. Here, the lead parts 124 have the shape of an elongated plate. A detection output is output from the element body part 122 to the outside via the two lead parts 124.

The output of the sensor element 120 is transmitted via a cable 150. The cable 150 includes a plurality of (here, two) wires 152 and an outer covering 151. The wires 152 are commonly-used covered wires in which a covering 154 is formed around a core wire 153. The outer covering 151 covers the two wires 152.

The outer covering 151 is removed at an end of the cable 150 and the two wires 152 are exposed. At an end of each of the two wires 152, the covering 154 is removed and the core wire 153 is exposed. The ends of the two wires 152 are arranged along the two lead parts 124, and the core wires 153 of the wires 152 are electrically and mechanically connected to the lead parts 124. Here, the core wires 153 are soldered to the lead parts 124.

It is not essential that the wires connected to the sensor element 120 are gathered together by the outer covering or the like. The wires connected to the sensor element may be individually drawn to the outside. The number of wires connected to the sensor element may be increased or decreased depending on the number of lead parts of the sensor element, for example. It is not essential that wires are connected to the sensor element, and a configuration is also possible in which another FPC (flexible printed circuit) or the like is connected to the sensor.

The resin cover part 130 covers the sensor element 120. Here, the resin cover part 130 includes the primary molded part 131 and a secondary molded part 140. The primary molded part 131 and the secondary molded part 140 are parts made of a resin. The primary molded part 131 and the secondary molded part 140 may be made of, for example, PE (polyethylene), polyamide, PBT (polybutylene terephthalate), or the like. The primary molded part 131 is a part that holds the sensor element 120. The secondary molded part 140 is a part that covers the primary molded part 131. As a result of the sensor element 120 being embedded into the primary molded part 131 and the secondary molded part 140, the sealing performance with respect to the sensor element 120 is enhanced.

More specifically, the primary molded part 131 is a part obtained by performing resin molding using a metal mold with the sensor element 120 serving as an insert member. The primary molded part 131 includes an element housing part 132 and a lead part housing part 136.

The element housing part 132 has a cuboid shape. The element body part 122 of the sensor element 120 is housed at a position at one end of the element housing part 132 that is located close to one main surface of the element housing part 132. The lead parts 124 extend from the element body part 122 toward the other end of the element housing part 132 through the element housing part 132.

The lead part housing part 136 is provided continuously from the other end of the element housing part 132. The lead part housing part 136 includes a bottom plate portion 137 and a partition portion 138. The bottom plate portion 137 has a plate shape protruding from the other end of the element housing part 132. The two lead parts 124 extend on the bottom plate portion 137. The partition portion 138 is provided so as to separate the two lead parts 124 from each other at an intermediate portion of the bottom plate portion 137 in a width direction.

From the one main surface at one end of the element housing part 132, one main surface of the element body part 122 is exposed. At least one (here, two) recess portion 132a is formed in the one main surface of the element housing part 132. At least one (here, two) recess portion 132b is formed in the other main surface of the element housing part 132. The two lead parts 124 are exposed from two sides of the element housing part 132 via the above-described recess portions 132a and 132b.

When the primary molded part 131 is molded using a metal mold with the sensor element 120 serving as an insert member, the exposed portions of the sensor element 120 are brought into contact with a metal mold surface or a positioning part of a metal mold device. With this, the primary molded part 131 is molded using a metal mold with the sensor element 120 positioned inside the metal mold device. Accordingly, the sensor element 120 is accurately held at a given position with respect to the primary molded part 131.

Note that the core wires 153 may be soldered to the lead parts 124 with the sensor element 120 inserted into the primary molded part 131. The core wires 153 may also be soldered to the lead parts 124 before the sensor element 120 is inserted into the primary molded part 131. It is not essential that the primary molded part 131 is molded using a metal mold with the sensor element 120 serving as an insert member. A configuration is also possible in which the primary molded part 131 molded using a metal mold into a shape in which the sensor element 120 is fittable, and the sensor element 120 is fitted in the primary molded part 131.

The secondary molded part 140 covers the primary molded part 131. The secondary molded part 140 may cover the entire periphery of the primary molded part 131, or may cover a portion of the primary molded part 131. Here, the secondary molded part 140 covers the entire periphery of the primary molded part 131 except for the portion of the primary molded part 131 that is used for positioning. Here, the outer shape of the secondary molded part 140 is an elongated cuboid shape. The element body part 122 is embedded in a portion of the secondary molded part 140 that is close to one end thereof. A leading end of the outer covering 151 of the cable 150 is embedded in a portion of the secondary molded part 140 that is close to the other end thereof. The portion of the cable 150 that is covered by the outer covering 151 extends outward from the other end of the secondary molded part 140. Note that the outer shape of the secondary molded part 140 is not necessarily a cuboid shape.

At least a portion of the surface 140F of the resin cover part 130, here namely, at least a portion of the surface 140F of the secondary molded part 140, is cross-linked. Here, the entirety of the outer surface 140F of the resin cover part 140 is cross-linked.

Similar to Embodiment 1, at least a portion of the surface 140F of the secondary molded part 140 is preferably electron beam cross-linked. By externally irradiating the secondary molded part 140 with an electron beam, at least a portion of the surface 140F of the secondary molded part 140 is electron beam cross-linked. In this case, the at least a portion of the surface 140F of the secondary molded part 140 has the highest crosslink density, and the crosslink density decreases inward. Note that the secondary molded part 140 may also be chemically cross-linked.

In the present embodiment, the primary molded part 131 includes rib portions 133, 134, 135a, and 135b that protrude toward the secondary molded part 140. The rib portions 133, 134, 135a, and 135b are portions that have a function of more reliably preventing ingress of water via a border between the primary molded part 131 and the secondary molded part 140.

Here, the secondary molded part 140 has holes 141, 142, 143, and 144 extending from the surface 140F of the secondary molded part 140 to the primary molded part 131. Here, the hole 141 is formed in one main surface of the secondary molded part 140 at a position close to an end thereof (see FIG. 2). This hole 141 reaches an intermediate portion of one main surface of the primary molded part 131 in the longitudinal direction thereof. The hole 142 is formed in the other main surface of the secondary molded part 140 at a position close to the other end thereof (see FIG. 3). This hole 142 reaches a portion of the other main surface of the primary molded part 131 close to the other end thereof. The pair of holes 143 and 144 are formed in the other main surface of the secondary molded part 140 at intermediate positions in the longitudinal direction thereof (see FIG. 3). The holes 143 and 144 reach intermediate portions of the other main surface of the primary molded part 131 in the longitudinal direction thereof.

When the secondary molded part 140 is molded using a metal mold with the sensor element 120 and the primary molded part 131 serving as insert members, positioning pins are passed through positions corresponding to the above-described holes 141, 142, 143, and 144 and are brought into contact with the surface of the primary molded part 131. With this, the secondary molded part 140 is molded using a metal mold with the primary molded part 131 positioned inside the metal mold device. Accordingly, the primary molded part 131 is accurately held at a given position with respect to the secondary molded part 140. Also, the sensor element 120 held by the primary molded part 131 is accurately held at a given position with respect to the secondary molded part 140.

The rib portions 133, 134, 135*a*, and 135*b* include annular rib portions that surround the holes 141, 142, 143, and 144.

More specifically, the rib portion 133 is an annular rib portion 133 that is provided on the surface of the primary molded part 131, and surrounds the hole 141. Preferably, a plurality of annular rib portions that surround the hole 141 are provided.

The annular rib portion 133 is formed in the shape of a circular projection. The annular rib portion 133 may be formed in the shape of an oblong projection or a polygonal projection. If a plurality of annular rib portions are formed, the annular rib portions may be formed concentrically around the hole 141. The annular rib portion 133 is preferably formed so as to have a smaller width toward the leading end side in the projection direction. Here, the surface of the primary molded part 131 includes, at the center of the annular rib portion 133, a bottomed hole 133*h* that has a bottom and into which the positioning pin can be fitted. As a result of the positioning pin being fitted into the bottomed hole 133*h*, the primary molded part 131 is positioned more accurately when the secondary molded part 140 is molded using a metal mold. It is not essential that the bottomed hole 133*h* is formed.

Similar to the rib portion 133, the rib portion 134 is an annular rib portion 134 that is provided on the surface of the primary molded part 131, and surrounds the hole 142. Similar to the bottomed hole 133*h*, a bottomed hole 134*h* is formed at the center of the annular rib portion 134 formed on the surface of the primary molded part 131. Preferably, a plurality of annular rib portions that surround the hole 142 are provided.

Similar to the rib portion 133, the rib portions 135*a* and 135*b* are respectively an annular rib portion 135*a* that is provided on the surface of the primary molded part 131 and surrounds the hole 143, and an annular rib portion 135*b* that is provided on the surface of the primary molded part 131 and surrounds the hole 144. Similar to the bottomed hole 133*h*, bottomed holes 135*h*1 and 135*h*2 are respectively formed at the centers of the annular rib portions 135*a* and 135*b*. Preferably, a plurality of annular rib portions that surround each of the holes 143 and 144 are provided.

Note that the bottomed holes 133*h*, 134*h*, 135*h*1, and 135*h*2 do not reach the sensor element 120 (see FIG. 7).

When the secondary molded part 140 is molded using a metal mold with the primary molded part 131 serving as an insert member, a heated and molten resin is injected into the metal mold. When coming into contact with the surface of the primary molded part 131, the heated and molten resin is abruptly cooled and solidified. At the leading ends of the annular rib portions 133, 134, 135*a*, and 135*b* (hereinafter, referred to as "annular rib portions 133 and so on"), the heated and molten resin is not abruptly cooled compared to the case where it comes into contact with the surface of the primary molded part 131. Therefore, the heated and molten resin for forming the secondary molded part 140 can be fused to the leading ends of the annular rib portions 133 and so on. That is to say, when the secondary molded part 140 is molded using a metal mold with the primary molded part 131 serving as an insert member, there is a risk that an interface may be formed at a boundary between a wide flat surface of the primary molded part 131 and the secondary molded part 140. However, at the leading ends of the annular rib portions 133 and so on, portions are likely to be formed in which a resin forming the primary molded part 131 and a resin forming the secondary molded part 140 are fused into one piece. Specifically, if the annular rib portions 133 and so on are formed so as to have a smaller width toward the leading end side in the projection direction, the leading ends of the annular rib portions 133 and so on are likely to be fused to the resin for forming the secondary molded part 140. Accordingly, at the boundary between the primary molded part 131 and the secondary molded part 140, more complete water stopping will be realized along the annular rib portions 133 and so on. Such annular rib portions 133 and so on may also be referred to as melt ribs. Preferably, the primary molded part 131 and the secondary molded part 140 are made of the same material so that the annular rib portions 133 and so on and the secondary molded part 140 are easily fused together.

Specifically, when the holes 141, 142, 143, and 144 for use in positioning are formed, the boundary between the primary molded part 131 and the secondary molded part 140 is exposed to the outside via the holes 141, 142, 143, and 144. Therefore, the rib portions 133, 134, 135*a*, and 135*b* are formed so as to surround the holes 141, 142, 143, and 144. This prevents water from entering a space between the primary molded part 131 and the secondary molded part 140 via the holes 141, 142, 143, and 144, and further reaching the element body part 122.

In order to maintain the water stopping effect using the rib portions 133, 134, 135*a*, and 135*b*, it is preferable to maintain the state in which the leading ends of the annular rib portions 133 and so on and the resin forming the secondary molded part 140 are fused together. Therefore, it is preferable that a portion (portion P extending to a position indicated by a dotted line in FIG. 8) extending from at least a portion of the surface 140F of the secondary molded part 140 to the leading ends of the annular rib portions 133 and so on is cross-linked. With this, the state in which the leading ends of the annular rib portions 133 and so on and the resin forming the secondary molded part 140 are fused together is more reliably maintained. Specifically, even under a high temperature environment, the fused state is more reliably maintained.

According to the sensor device 110 having such configurations, at least a portion of the surface 140F of the resin cover part 130 has been hardened by being cross-linked. Therefore, the resistance of the sensor device 110 to external damage is improved.

Specifically, a case is assumed in which the sensor device 110 is used as a sensor that is provided around a wheel of an automobile and detects the wheel speed using a magnetic field or the like. In this case, there is a risk that while the automobile is traveling, a flying stone or the like may hit the sensor device 110. If at least a portion of the surface 140F of the resin cover part 130 has been hardened by being cross-linked, the sensor device 110 will be unlikely to be damaged. Also, there is a risk that regions around the wheels of an automobile may be in a high temperature environment during the travel. If at least a portion of the surface 140F of the resin cover part 130 has been hardened by being cross-linked, the hardened state will be maintained even under a high temperature environment, and the resistance to external damage will be maintained.

To improve the resistance to external damage under a high temperature environment, it is also conceivable to cover the sensor element with, for example, a heat resistant resin. In this case, it is conceivable to use a resin excellent in heat resistance. However, if such a resin is used, the molding temperature of the resin that covers the sensor element will be high, and the sensor element may be affected by heat. In the present embodiment, it is sufficient that a normal resin is used to form the resin cover part 130 so as to cover the sensor element 120, and thus the molding temperature need not be as high as that in the above-described case. Therefore, the sensor element is unlikely to be affected by heat.

Also, in the present embodiment, at least a portion of the surface 140F of the resin cover part 130 is electron beam cross-linked. The purpose of the electron beam cross-linking is to harden the surface 140F of the resin cover part 130, and thus it is sufficient that a region of the resin cover part 130 that does not reach the sensor element 120 provided inside is cross-linked. Therefore, the sensor element 120 is unlikely to be affected by electron beams. Even if also the portion in which the leading ends of the annular rib portions 133 and so on and the resin forming the secondary molded part 140 are fused together is electron beam cross-linked, it is sufficient that a region of the resin cover part 130 that does not reach the sensor element 120 provided inside is cross-linked. Therefore, the sensor element 120 is unlikely to be affected by electron beams.

Also, such a case where at least a portion of the surface 140F of the resin cover part 130 is electron beam cross-linked has an advantage that a cross-linking agent or the like does not need to be added to the resin for forming the resin cover part 130.

Also, if the crosslink density of at least a portion of the surface 140F of the resin cover part 130 is higher than the crosslink density of a region behind that portion, this is advantageous for improving the resistance to external damage. Here, since the crosslink density of the at least a portion of the surface 140F of the resin cover part 140 is higher than the crosslink density of a region behind that portion, the resistance to external damage is improved.

Also, since the cross-linking of the resin cover part 130 is made in the region that extends from the surface 140F thereof to the leading ends of the annular rib portions 133 and so on, there is an advantage that the water stopping effects using the annular rib portions 133 and so on are likely to be maintained.

Also, the annular rib portions 133 and so on are formed so as to surround the holes 141, 142, 143, and 144 in the surface of the primary molded part 131. The holes 141, 142, 143, and 144 can be used as holes for positioning pins for positioning the primary molded part 131 when molding the secondary molded part 140 using a metal mold. Thus, the primary molded part 131 and the sensor element 120 are accurately positioned and held in the secondary molded part 140. Also, the portion in which the leading ends of the annular rib portions 133 and so on and the resin forming the secondary molded part 140 are fused together has been hardened, and the state of the fused portion is maintained. This prevents water from entering a space between the primary molded part 131 and the secondary molded part 140 via the holes 141, 142, 143, and 144.

Modifications

In Embodiment 2, it is not essential that the annular rib portions 133 and so on are formed. The ribs for stopping water do not need to be formed at positions surrounding the holes 141, 142, 143, and 144.

Note that the above-described embodiments and modifications can be freely combined unless they contradict each other.

The invention claimed is:

1. A sensor device comprising:
   a sensor element; and
   a resin cover part that covers the sensor element, wherein
      the resin cover part includes (i) a primary molded part that holds the sensor element, and (ii) a secondary molded part that covers the primary molded part,
   wherein at least a portion of a surface of the resin cover part is cross-linked and at least a portion of a surface of the secondary molded part is cross-linked.

2. The sensor device according to claim 1, wherein the at least a portion of the surface of the resin cover part is electron beam cross-linked.

3. The sensor device according to claim 1, wherein the at least a portion of the surface of the resin cover part has the highest crosslink density.

4. The sensor device according to claim 1, wherein the primary molded part includes a rib portion that protrudes toward the secondary molded part, and a portion that extends from the at least a portion of the surface of the secondary molded part to a leading end of the rib portion is cross-linked.

5. The sensor device according to claim 4, wherein the secondary molded part has a hole extending from the surface of the secondary molded part to the primary molded part, and
   the rib portion includes an annular rib portion that surrounds the hole.

6. The sensor device according to claim 2, wherein the at least a portion of the surface of the resin cover part has the highest crosslink density.

* * * * *